Jan. 15, 1963

A. PETRIGALLA 3,073,999

STATIC BATTERY CHARGER

Filed July 28, 1960

INVENTOR.
ANDREW PETRIGALLA
BY
ATTYS.

FIG. 2

INVENTOR.
ANDREW PETRIGALLA

Jan. 15, 1963

A. PETRIGALLA 3,073,999

STATIC BATTERY CHARGER

Filed July 28, 1960

INVENTOR.
ANDREW PETRIGALLA
BY

ATTYS.

Jan. 15, 1963

A. PETRIGALLA 3,073,999

STATIC BATTERY CHARGER

Filed July 28, 1960

INVENTOR.
ANDREW PETRIGALLA
BY

ATTYS.

United States Patent Office 3,073,999
Patented Jan. 15, 1963

3,073,999
STATIC BATTERY CHARGER
Andrew Petrigalla, Parma, Ohio, assignor to The Hertner Electric Company, Cleveland, Ohio, a corporation of Ohio
Filed July 28, 1960, Ser. No. 45,862
12 Claims. (Cl. 320—40)

The present invention relates to battery charger systems and controls, and especially to a static battery charger for controlling the charging current supplied to batteries under charging conditions and to automatically regulate such charging current as the battery charging operation progresses and to reduce the charging current to substantially zero when fully charged conditions are realized.

The present invention has for its general object the provision of an improved static battery charger characterized by the provision of a logic or control circuit in the battery charging system effectively controlling the maximum initial charging current for the batteries and with the battery charger effectively reducing the amount of charging current flowing with increase in the battery voltages.

Another object of the invention is to use saturable reactors in the power supply for the battery charger and with control coils also being provided on the reactors and being controlled by conditions in the charging circuit for effectively regulating the charging action to obtain an efficient and safe battery charging action.

Another object of the invention is to provide control coils in saturable reactances in apparatus of the class described where circuits for the control coils are provided and include a zener diode or other firing devices with similar action, as a Schmitt trigger, for example, and a transistor circuit for opening or closing a power supply to the control coils when predetermined currents flow in the battery charging circuit.

Another object of the invention is to provide an automatic control circuit for battery charging action to limit the charging current after the batteries have reached a fully charged condition.

Further objects of the invention are to control the current supply for a load by the voltage at the load and by the load current itself; to control the load current flow through a charging system under changing load conditions; to reduce the load current gradually as the battery approaches a full charge condition and the voltage of the load batteries increases; to use a special control circuit sensed from and powered by the voltage across the load to shut off load current when the batteries are fully charged; to use voltages proportional to the power supply voltage and to the load current for control actions in a battery charging system; to provide a control system usable with three, or one phase alternating current power supply for direct current supply to a battery charging load; to use a modified three wire control circuit with a common positive lead and two negative leads in the control circuit; to provide a zener diode, or similar device, in parallel with a transistor in a control circuit to continue a modified control action in the load circuit when the transistor circuit is open; to use a transistor trigger circuit to regulate current flow in the reactor control coils; and to regulate the action of the reactance control coils by transistors controlled by voltages proportional to load current or battery voltage.

The foregoing and other objects and advantages of the invention will be made more apparent as the specification proceeds.

Reference now should be had to the accompanying drawings wherein.

Corresponding numerals are used on the drawings and in the specification to facilitate comparison between like parts shown in the drawings and described in the following specification.

Figures 1, 3:
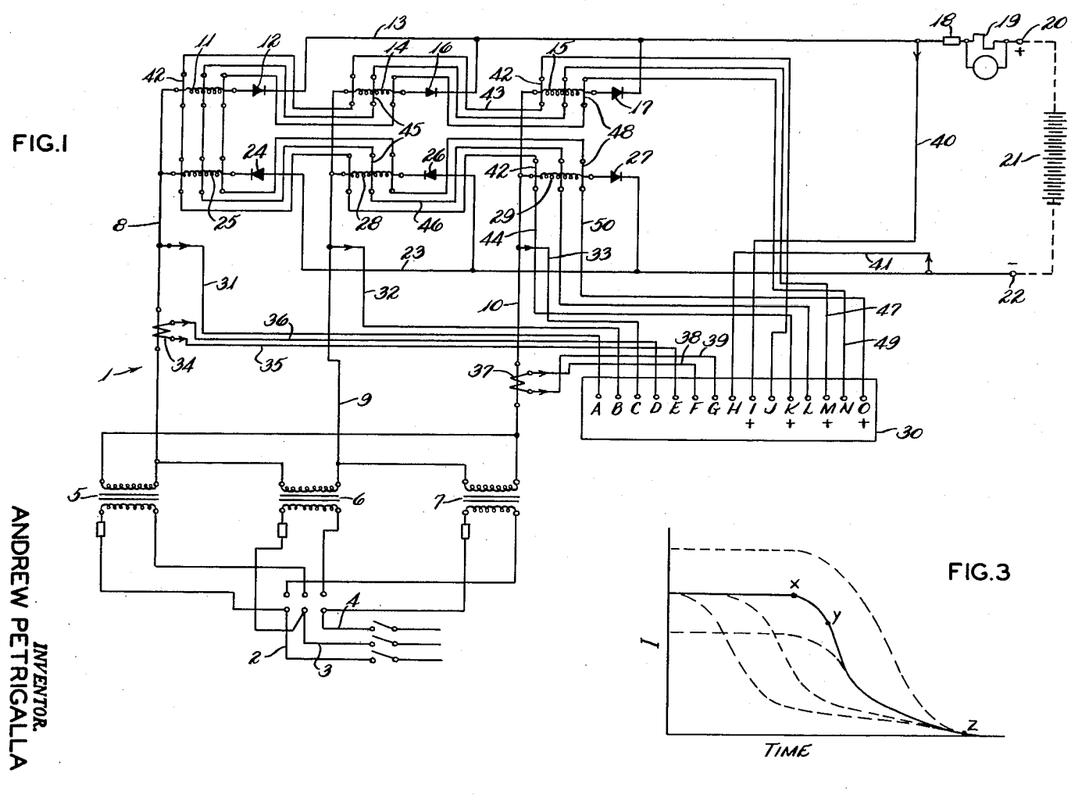
FIG. 1 shows an electrical circuit of a static battery charger embodying the principles of the invention.
FIG. 3 is a typical current flow diagram for a battery charging action obtained by use of the battery charger of the invention.

Attention now is particularly directed to the details of the static battery charger of the invention, and this charger is indicated as a whole by the numeral 1 in the accompanying drawings. Conventional three phase A.C. power supply is provided to the battery charger through leads 2, 3 and 4 that connect in a conventional manner to the primaries of transformers 5, 6 and 7. Output from these transformers flows through power supply leads 8, 9 and 10 that extend from the secondaries of these transformers 5 through 7, respectively, to supply alternating current at a desired voltage to the remainder of the battery charging system. The power lead 8 connects to a saturable reactor 11 and through it to a conventional diode 12 and to a positive load lead 13. Similarly reactors 14 and 15 are connected to the other power leads 9 and 10 and through similar diodes 16 and 17, respectively, to the positive lead 13 so that pulses of D.C. current will be provided to the positive load lead 13.

Power from the positive load lead 13 may flow through a fuse 18 and through an ammeter 19, if desired, to a load terminal 20. Preferably the static battery charger 1 of the invention is used for battery charging actions and hence load is shown in the form of a multi-cell battery 21 electrically connected between the terminal 20 and a negative load terminal 22. Current then flows through a negative load lead 23 connected to the terminal 22 and back through a diode 24 connected to a saturable reactor 25 which connects back to the power lead 8. Likewise, the negative load lead 23 also connects back through diodes 26 and 27 that connect, respectively, through saturable reactors 28 and 29 and to the power leads 9 and 10, respectively. It will be realized that all of the reactors 11, 14, 15, 25, 28 and 29 can be generally of conventional construction and that the diodes shown are connected thereto for power flow in the directions indicated.

In order to collect and use the various sensing data required to effect the control action set forth hereinafter in more detail, a terminal board or panel 30 is provided and terminals A, B and C thereon, respectively, connect by leads 31, 32 and 33 to power leads 8, 9 and 10, respectively. Thus the voltage of the power supply to the system of the invention can be used for sensing action by the control means provided.

In order that the current flowing in the power leads be available for use for control or sensing action, a current transformer 34 connects to terminals D and E on the terminal panel by leads 35 and 36 while a similar current transformer 37 connects to terminals F and G by leads 38 and 39. These transformers are inserted into the leads 8 and 10.

Other important control and sensing functions of the apparatus of the invention are dependent upon the voltage across the load and appearing on the leads 13 and 23 at the load so that leads 40 and 41 connect to the positive load lead 13 and negative load lead 23, respectively, and to terminals I and H, respectively, on the terminal panel 30.

So as to provide the desired control action on currents flowing through the saturable reactors in the static battery charger 1, a control coil 42 is operatively associated with each one of the reactors 11, 14, et al. and is so wound and arranged as to create a magnetic field tending to desaturate the said reactors when the load currents are flowing through these reactors. These control coils 42 are connected in series with each other by leads 43 and 44 that connect to terminals J and K, respectively, on the terminal panel.

A second series of control coils 45 is operatively associated with each of the reactors 11, 14 et al. by leads 46 and 47. Again, the control coils are so connected and arranged as to provide magnetic fields tending to desaturate the reactors 11, 14, etc. The leads 46 and 47 likewise connect the control coils 45 in series with each other and connect to terminals L and M, respectively, on the terminal panel.

The reactors 11, 14 et al, are of the self-saturating type and are designed and built so that they would not be completely saturated by load current flowing through their load coils. Preferably in order to maintain the reactors 11, 14 et al. functioning at a chosen degree of saturation under normal load conditions, third control coils 48 are operatively associated with each of the reactors but these coils 48 are so wound and associated with the reactors as to add to or increase the saturation of said reactors when the current is flowing through these coils. Suitable leads 49 and 50 connect the control coils to each other in series and to the terminals N and O provided on the terminal panel.

Considering now the current flow characteristics in the load circuit of the battery charger of the invention, as shown in FIG. 3, it will be seen that a maximum current is indicated as flowing in the load circuit until condition X is reached at which time the battery voltage has increased to such a point as to prevent excessive current flow therethrough without external control action, but until the time that such condition or point X is reached in the charging cycle, some external member must be provided in the load or battery charger system to prevent excessive charging current from flowing. Then during the next phase in the battery charging operation, the amperage in the load circuit will gradually decrease until condition Y is established. Additional control action is exerted through the novel control means of the invention as the charge cycle progresses between conditions Y and Z therein, and then when condition Y is reached, approximating full charge of the battery, an additional control action can be effected to reduce the load or battery charging current to substantially zero at condition Z by further control action in the novel battery charging system, or static battery charger 1 of the invention.

Figure 2:
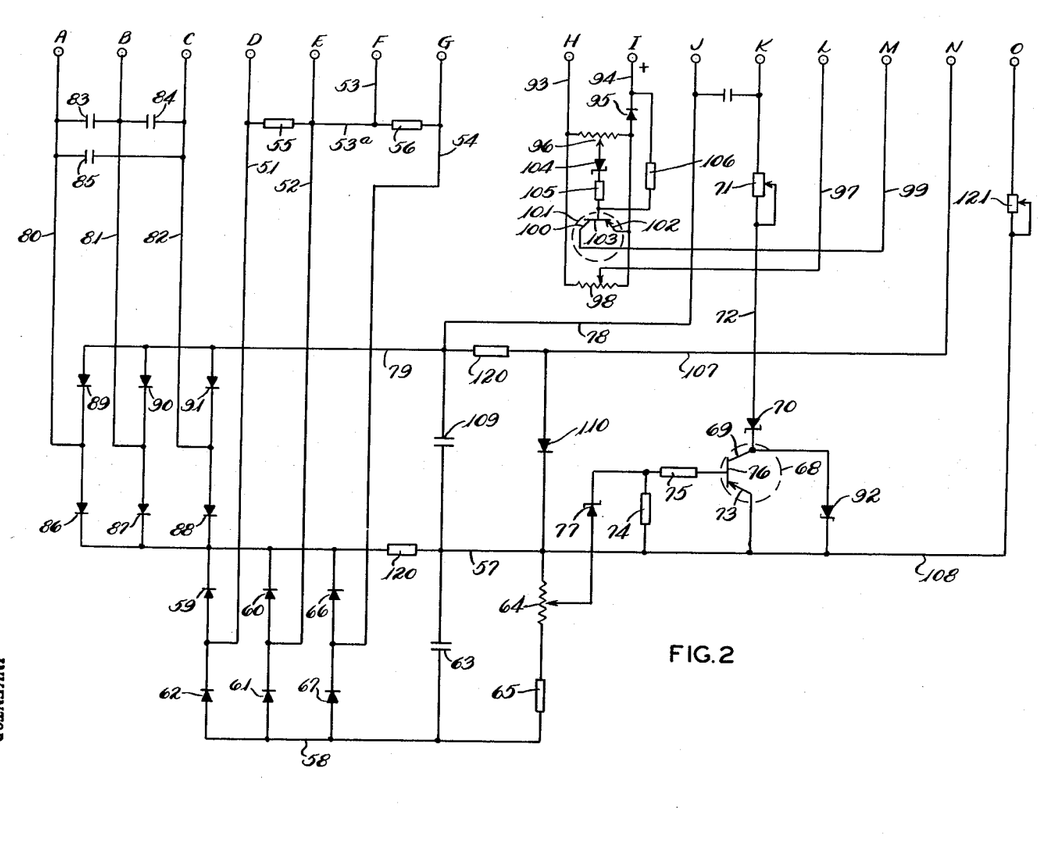
FIG. 2 is an electrical diagram of the details of the control circuit used with the apparatus of FIG. 1.

Attention now is directed to the details of the control and sensing means shown in FIG. 2 of the drawings and these means will effect the control actions required to aid in providing the load current control, as shown in FIG. 3. The current limiting function provided in the control means of the battery charger are provided through terminals D, E, F and G which are shown as having leads 51, 52, 53 and 54, respectively, connected thereto. Voltage limiting resistances 55 and 56, of suitable value, are connected between leads 51 and 52, and 54 and extend to what could be considered a rectifier bridge system including a positive control lead 57 and a negative control lead 58. The alternating current supplied through leads 51 and 52, and 54 is rectified in the said bridge, as by means of suitable diodes 59, 60, 61 and 62 connected respectively between the leads 51 and 52 and the positive control lead 57, and between the leads 51 and 52 and the negative control lead 58. Further coupling also is provided between the positive and negative control leads 57 and 58 and the power leads through the terminals F and G and the leads 53 and 54 to form a three phase rectifier bridge. The lead 53 is connected to the lead 52 by a lead 53a and a second rectifier bridge is provided between these leads 52 and 54 using the diodes 60 and 61 and additional rectifier diodes 66 and 67 are connected between the lead 54 and the positive control lead 57, and between the lead 54 and the negative control lead 58, respectively, for current flow in the directions indicated. A filter condenser 63 is shown connected between the positive and negative control leads 57 and 58 while a potentiometer 64 and a suitable resistance 65 are connected across the leads 57 and 58. Thus the voltage between the positive and negative control leads 57 and 58 is proportional to the vector sum of the current flowing in the load leads 8, 9 and 10, respectively, because of the transformer coupling between the leads 51, 52 and 54 and the load leads 8, 9 and 10. The resistance 65 is used to provide more sensitivity in the potentiometer 64. The actual current regulating action up until condition X is reached in the charging cycle is performed through, or obtained by, the control coils 42 connected to the terminals J and K on the terminal panel and the control circuit connected to such terminals includes a transistor 68, the collector 69 of which is connected through a zener diode 70 to a lead 72, and a resistor 71, that connects to the terminal K. The emitter 73 of the transistor 68 connects to the positive control lead 57 and the collector thereof is connected through zener diode 92 to the same positive lead 57. A resistance 74 and a further resistance 75, both of accurate, predetermined resistivity, connect to the base 76 of this transistor 68 to connect it to the positive control lead 57. The zener diodes 70 and 92 are always conducting and provide substantially constant voltage reference which is used, as will be described thereafter, to make apparatus operation insensitive to input voltage variation.

The biasing applied to the base 76 of the transistor 68 is further controlled by means of a zener diode 77 connected to the potentiometer 64 so that when a predetermined voltage is exerted on this zener diode 77, it will fire or close to apply a negative voltage to the resistance 75 and hence to the base 76 in relation to the positive biasing of the emitter 73 whereby the transistor 68 will become conductive and more current will flow in the coils 42 than when such current flows through a circuit including the zener diode 70. The zener diode 77 is of the type that remains conductive when once fired by suitable voltage applied thereto as long as such voltage is maintained. Current flows back from these coils 42 to the terminal J and from it through lead 78 to a second negative control lead 79 in the control system. This current in coils 42 acts to cause the reactors 11 et al. to absorb more voltage thereby tending to reduce the amount of load current. Thus, the load current will remain at the set maximum value until outside conditions, i.e. rising battery voltage level, cause a change in the operation. The potentiometer 64 provides a simple adjustment of the current limiting point. In this way a very sharp current limiting action is obtained in a saturable reactor controlled system utilizing a zener diode 77 in the combination with the transistor 68 as a switch.

Power is supplied to control circuits formed between the second negative control lead 79 and the positive control lead 57 from terminals A, B and C that have the load supply voltage applied thereto. Leads 80, 81 and 82 are connected to these terminals A, B and C and have condensers 83, 84 and 85 connected therebetween to reduce surge voltages caused by the interwinding capacity of the transformers 56 and 57. Leads 80 through 82 continue past the condenser circuits and extend to a three phase rectifier bridge similar to that formed between the leads 51, 52 and 54. Thus diodes 86, 87 and 88 connect, respectively, to the leads 80, 81 and 82 and connect them to the positive control lead 57 for flow of rectified D.C. current thereto, and the D.C. current from the second negative control lead 79 will flow back to the leads 80, 81 and 82, respectively, through diodes 89, 90 and 91, respectively, connecting to this second negative control lead. Hence the circuit flowing from the control coils 52 through lead 78 will return back to the power leads 8, 9 and 10.

When the charged battery voltage has increased so that point X on the curve shown in FIG. 3 has been reached, at that time the voltage available at the potentiometer 64 will be insufficient to retain the zener diode 77 conductive, and the transistor 68 will also be made non-conductive at that time. However, the zener diode 92, connected in parallel with the emitter and collector circuit of the transistor 68, is always conductive when the transistor 68 is open so that a continuing, but limited current will flow through the control coil 42 through the zener diodes 70 and 92 for gradual reduction, or increasing in the total load current, as the input line voltage changes, so that charging current remains substantially constant.

In this circuit operation, the zener diodes 70 and 92 serve as a constant voltage reference which voltage is subtracted from the voltage disposable across filtering capacitor 109 and which variations are subjected and proportional to a variation of the power supply voltage. The voltage difference between the voltage across said capacitor 109 and said reference voltage across zener diodes 70 and 92 which is variable, and proportional to the variations of the power supply voltage, is applied to the control coil 42 through adjustable resistor 71 in such a way that current in this coil flows in opposite direction as the current in the bias winding 48, and performs modification of the saturation level in the reactors. Therefore said voltage difference available for such purpose is provided by selecting the proper zener breakdown, or firing voltage of the zener diodes 70 and 92 in such a way that the differential voltage applied to the control coil 42 produces a variable current proportional to this voltage difference to obtain an output current in the load, i.e. battery charging current unaffected by the variations of the power supply voltage.

Substantially constant voltage is applied between the positive control lead 108 and the second negative control lead 107 during the operation of the static battery charger 1 whereby the control action effected between points X and Y on the curve will be primarily occasioned by and be due to increased counter electromotive force of the battery and current through the battery being charged, as the charging cycle progresses.

When condition Y has been reached in the charging cycle and the battery voltage is almost at maximum, then the voltage across the battery load, as measured by leads connecting to terminals H and I will effect a control action through the control means connected thereto. FIG. 2 best shows that leads 93 and 94 connect to these contacts H and I, and that a biasing diode 95 is provided in the lead 94 to provide a positive biasing of the base 103 of the transistor 101 when not in operation. A resistance may be substituted for the constantly conductive diode 95, if desired. A potentiometer 96 is connected between the leads 93 and 94 with a zener diode 104 in series with the adjustable tap of that potentiometer and resistors 105 and 106 to provide a firing action of the said zener diode when the predetermined voltage level of the battery is reached.

The final control action in the battery charger 1 is effected through the control coils 45 and these coils are connected to terminals L and M on the terminal panel 30. The magnetic flux produced by these coils 45 has the same direction as the flux in the coils 42, i.e. opposite direction of the magnetic flux in the bias coils 48. The terminal panel contact L connects through a lead 97 to a potentiometer 98 that is connected to the lead 93, while the opposite lead 99, connecting to terminal M, connects to the collector 100 of the transistor 101. The emitter 102 of this transistor connects to the lead 94 while the base 103 of the transistor 100 is provided to be biased negatively with regards to the emitter 102 by connecting to the potentiometer 96 so that as the diode 95 is conductive, the potentiometer 96 will connect through a suitable firing member, the zener diode 104, which is actuated, or fired, when sufficient voltage is applied thereto, and, usually through some type of a limiting resistance 105, to the base 103 to make it negative to the emitter whereby the transistor will become conductive under load conditions approaching fully charged batteries. The biasing resistor 106 connects the base 103 of the transistor 100 directly over the lead 94 to maintain such base positive with reference to the emitter 102 until the zener diode 104 is fired. The control coils 45 are energized at condition Y to aid in reducing the load current more and more as the battery voltage rises to send more current through the coils 45, and to maintain about a zero current when condition Z is reached. The control coils 42 will remain energized for the remainder of the charge cycle when the circuit through the zener diode 104 is fired, or closed.

The control circuit of the invention also preferably includes a stabilized voltage supply that is provided between continuations of the second negative control lead 79 and of the positive control lead 57 indicated at 107 and 108, respectively. The voltage supply of fixed value is obtained by providing a resistor 120, a zener diode 110, and the capacitor 109 between or in the leads 79 and 57, as shown. These leads 107 and 108 connect to the terminals N and O respectively and from them to the biasing control coils 48 on the reactors hereinbefore described. Thus a constant bias is applied through the leads 107 and 108 to these coils 48 to aid in maintaining the reactors operating at the properly chosen saturation point. This point is selected in accord with the operation level of the arrangement and is adjusted by the setting of the variable resistor 121.

It will be realized that the various condensers, resistances, diodes, transistors and other members in the circuit are chosen to have proper characteristics for the load conditions encountered and for the control actions desired. Changes may be made in the control circuits, for example, the two transformers 34 and 37 may be replaced by one transformer especially if the load is balanced on the three phase power supply, and the potentiometer 98 may be omitted where the collector 100 is designed to carry the battery voltage applied thereto.

Figure 4:
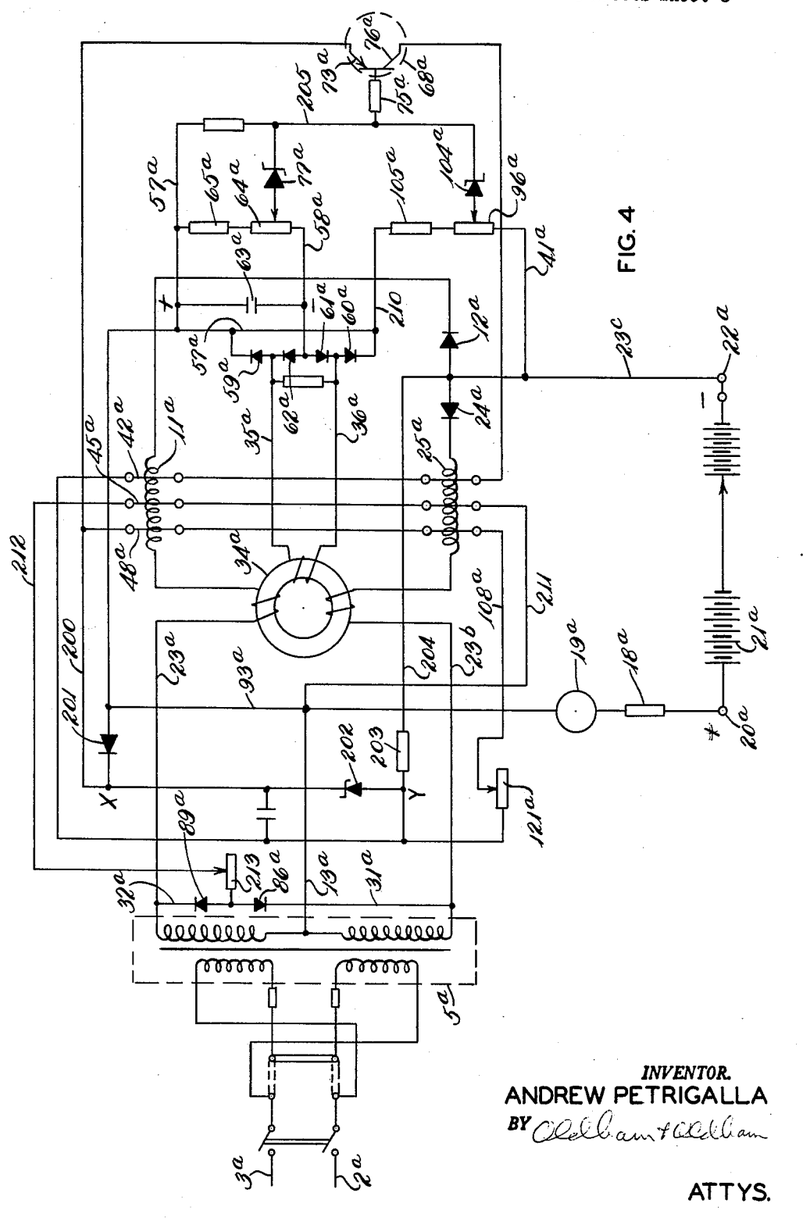
FIG. 4 is a modified circuit diagram of the static battery charger of the invention as applied to a single phase power supply.

Regarding the details shown in the modified circuit of FIG. 4, 110 volt A.C. power leads 2a and 3a connect to a transformer 5a which has a positive load lead 13a connected to a center tap on the transformer secondary and with two negative load leads 23a and 23b connecting to opposite ends of the transformer secondary. The positive load lead 13a connects through a suitable fuse 18a and an ammeter 19a, if desired, to the positive load terminal 20a. One negative load lead 23a extends to a current transformer 34a and from it such negative load lead connects to a saturable reactance 11a and then through a conventional diode 12a to a negative output load lead 23c and the negative load terminal 22a. The second negative load lead 23b also connects to the current transformer 34a and from it to a saturable reactance 25a and a conventional diode 24a. The diode 24a is adapted to conduct the opposite cycle of current from the diode 12a whereby pulses of current will flow alternately through the saturable reactances 11a and 25a for flow to the battery 21a or equivalent load applied between the load terminals.

The novel control functions of the present circuit are performed with the apparatus shown in FIG. 4 with a minimum amount of controls but with the same three sensing steps and actions being obtained by the circuit shown in FIG. 4 as with the three phase circuit control shown in FIGS. 1 and 2. Three reactance control coils 42a, 45a and 48a are associated, respectively, with each of the reactances 11a and 25a and these reactance control coils have the same functions as in the circuitry shown in FIGS. 1 and 2. Again, the corresponding coils in the different reactances are connected in series with each other.

The biasing to determine the degree of saturation at which the reactances 11a and 25a operate is provided by a lead 200 that connects to the positive load lead 13a through a conventional diode 201. A constant reference voltage is obtained between points X and Y shown in FIG. 4, which points have a zener diode 202 connected therebetween and with the point Y connecting to the output negative load lead 23c through a suitable control resistor 203 present in the lead 204. The zener diode 202 is selected so that it is always conductive under the voltages applied thereto. A variable resistance 121a is provided in a lead 108a that connects the point Y to the reactance coil 48a for flow of the biasing current thereto.

A voltage proportional to the current flow through the transformer 34a is taken therefrom by leads 35a and 36a and transmitter to a rectifier bridge including diodes 59a, 60a, 61a and 62a connected together for current flow to a positive output lead 57a and to a negative output lead 58a. A smoothing condenser 63a connects between these leads 57a and 58a while suitable resistances, or a potentiometer 64a and a resistance 65a also connect between these leads 57a and 58a.

As in the other embodiments of the invention, a zener diode 77a is connected between the resistance or potentiometer 64a and a lead 205 that connects through a current limiting resistance 75a to the base of a transistor 68a. Again, as in the circuit of FIG. 2, a predetermined voltage must be applied to the zener diode 77a to render it conductive and to make an emitter 73a of the transistor positive with respect to the base. The emitter 73a is connected to the reference voltage point X in the drawing which maintains such emitter positive at a set voltage at all times. The collector 76a of the transistor is connected to the control coils 42a for current flow therethrough dependent upon or proportional to the current flowing in the load leads in the apparatus shown. Thus as the current in the main load lead increases, increased voltage is generated in the transformer 34a which produces increased current flow through the control coils 42a which tends to desaturate the reactances 11a and 25a and increase the voltage loss thereat whereby less voltage will be available for application to the battery load 21a and smaller currents will flow therethrough for charging action.

Control in the circuit of FIG. 4 dependent upon supply voltage fluctuation is effected by a circuit including lead 211 connecting the positive load lead 13a to the control coil 45a. The circuit from control coils 45a includes a lead 212 connecting to a potentiometer or variable resistance 213. Leads 31a and 32a connect the negative load leads 23b and 23a, respectively, through a rectifier bridge made from diodes 36a and 89a to the member 213. Hence currents proportional to the supply voltage will be provided in the control coils 45a.

In order to control current flowing through the load dependent upon change in the voltage across the load, a lead 41a is shown connecting directly to the negative output lead 23c whereas the opposite voltage control lead 93a connects the positive load lead 13a to the positive control lead 57a. The lead 41a connects through a suitable potentiometer 96a and a control resistance 105a to a lead 210 connected to the positive control lead 57a. A zener diode 104a is connected to the potentiometer 96a and also connects through the resistance 75a to the base 76a of the transistor 68a. Thus when sufficient voltage is applied across the zener diode 104a, such zener diode will fire or be conductive to make the base of the transistor negative with respect to the emitter 73a for current flow therethrough, based upon the counter E.M.F. set up across the battery load as the charge cycle progresses, to the control coils 42a.

The cooperation of the various portions of the circuit components shown in FIG. 4, it will be seen, is in general the same as that required in the three phase circuit shown in FIGS. 1 and 2. Hence, the simplified circuit will furnish control action for regulation of battery charging currents with changes in the battery condition as the charge cycle progresses. However, the circuit only requires one transistor, and the control coils 42a and 45a are energized by slightly different circuits but by the same control principles as the circuits of FIGS. 1 and 2.

Figure 5:
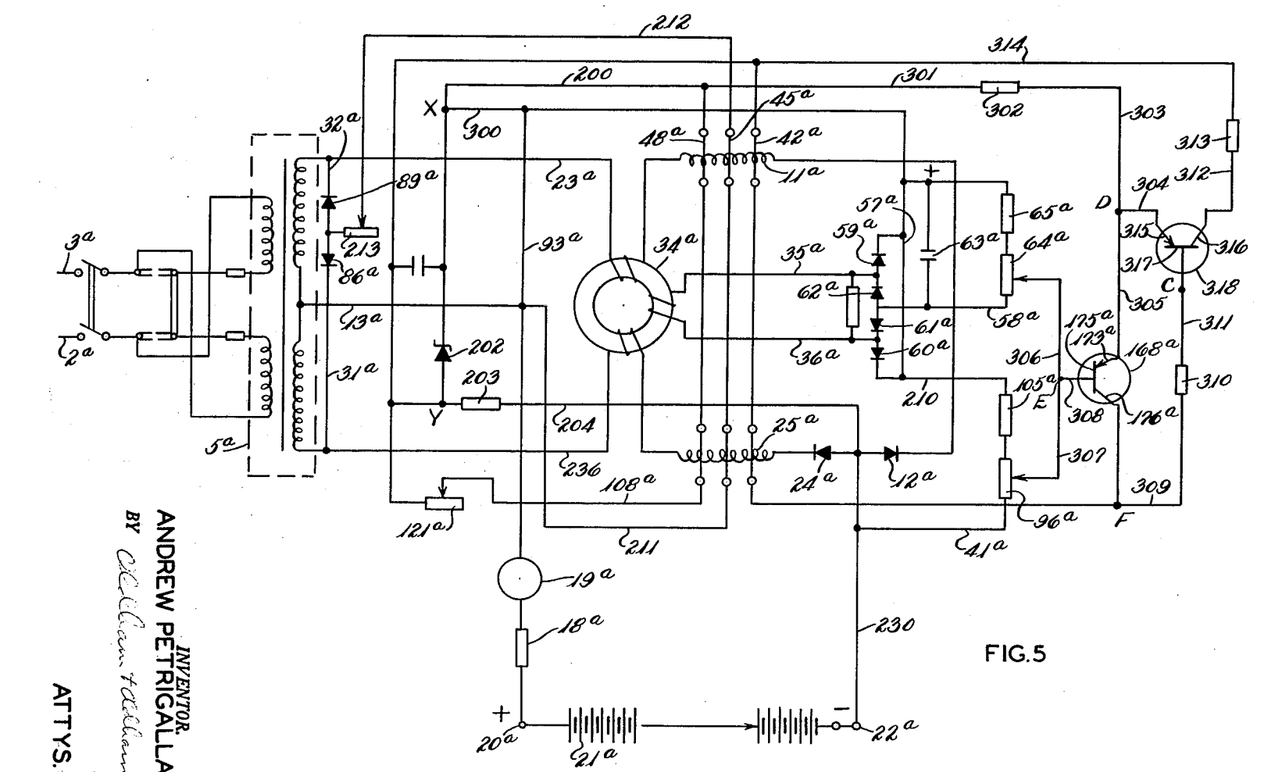
FIG. 5 is a modified single phase circuit diagram of the static battery charger of the invention using transistor controls.

Another novel circuit arrangement, in accordance with the invention using a transistor trigger circuit based on the Schmitt trigger circuit, instead of two zener diodes 77a and 104a as shown in FIG. 4, is shown in the FIG. 5. The remaining elements of FIG. 4 are also used in the circuit of FIG. 5. This circuit of FIG. 5 provides a similar firing and regulating condition as the arrangements shown in FIGS. 1, 2 and 4. In order to provide desired control action, the circuit is composed of a transistor 168a, FIG. 5, of which the base 175a is connected by leads 308, 306 and 307 to voltage and current sensing potentiometers 64a and 96a, respectively. The collector of this transistor is connected to the control coil 42a in the same way as in FIG. 4, to perform a regulating action in the reactors. The collector 176a is connected by another lead 309 and a resistor 310, and a lead 311 to a base 317 of a second transistor 318. Emitter 315 of this second transistor 318 is connected by a lead 304 to leads 305 and 303 which are connected to emitter 173a of the transistor 68a, and to a resistor 302, respectively. The resistor 302 is connected by leads 301 and 200 to a point X which is the positive side of the power supply for the control circuit. The collector 316 of the transistor 318 is connected by a lead 312, a resistor 313, a lead 314 to a point Y, which is a negative side of the power supply for the control circuit.

With reference to the same FIG. 5, the transistor 318 is biased to be initially fully "on" and transistor 168a fully "off." The base current of the transistor 318 flows through the resistor 310 and then through the control coil 42a which value can be adjusted to establish sufficient negative voltage at the point C with reference to the point D for the fully "on" condition in the transistor 318. The emitter current of the transistor 318 produces a voltage drop across resistor 313. The resulting positive potential at point D keeps the transistor 168a completely "off" until the signal at the point E becomes sufficiently negative with respect to the point D to initiate conduction in the transistor 168a. The collector 176a of the transistor 168a is connected to the control coil 42a for current flow therethrough dependent upon the current flowing condition in the load leads 23a and 23c in the apparatus shown. Thus, as the current in the main load leads increases, increased voltage is generated in the transformer 34a which produces increased negative potential at the potentiometer 64a to make a potential at the point E, which is connected by the lead 308 directly to the base 175a, more negative with respect to the point D and consequently to make a transistor 168a conductive, which produces current flow through the control coils 42a, which tend to desaturate the reactances 11a and 25a and increase the voltage loss thereat, whereby less voltage will be available for application to the battery load 21a and smaller current will flow therethrough for charging action.

Now when the collector current starts to flow through control coils 42a it increases the voltage drop across these coils. Point F therefore becomes less negative with respect to E and to D, tending to reduce conduction in the transistor 318. As the current of the transistor 318 lessens, the potential at D with respect to E rises in the negative direction and thus accelerates conduction in the transistor 168a. This in turn speeds the increase in positive potential at F and the cut-off of the transistor 318 until finally the transistor 318 is cut off and the transistor 168a becomes fully conducting. This condition is maintained as long as the negative potential at E is sufficiently greater than the negative voltage at D. When the voltage at E becomes less negative with respect to D, the collector current in the transistor 168a is reduced, tending to increase the negative potential of F with respect to D and the negative potential at C with respect to D. Conduction in the transistor 318 begins, and the resulting potential at D hastens cut-off of the transistor 168a which in turn causes an increase in negative potential at F and accelerates the firing of the transistor 318.

The cooperation of the various portions of the circuit components shown in FIG. 5 is in general the same as that required in the circuits shown in FIGS. 1, 2 and 4. Hence, the trigger circuit will replace the two zener diodes and furnish control action for regulation of the battery charging current. The control coil 42a is energized by different circuit but by the same control principles as in the circuits shown in FIGS. 1, 2 and 4.

It is evident that the control action in the last stage of the charging cycle after point Y in the charging curve in FIG. 3 is reached is performed and follows the similar way as is described hereinbefore for the first portion of this curve until the point X on the charging curve is reached, but in this case the potentiometer 96a connected through leads 307 is in operation, and is energized by the battery voltage instead of by the current transformer 34a as described.

Apparatus operation between the points X and Y on the charging curve in the FIG. 3 is identical to the operations of arrangements shown and described in FIGS. 1, 2 and 4.

The zener diodes referred to in the apparatus may be special semiconductor diodes having the characteristics required for control and provision of constant reference voltages, or they may be semiconductor diodes operating at the zener point or region. Type PNP transistors are used in the circuits shown.

From the above, it will be seen that a novel and improved type of a static battery charger has been provided by the invention and that this control circuit is adapted to change the control action by the senses supplied thereto from the battery charging circuit. Three different operating conditions are set up in the control system depending upon the actions occurring in the load circuit and the voltages and resistivities set up therein. Thus it is believed that the objects of the invention have been achieved.

While several complete embodiments of the invention have been disclosed herein, it will be appreciated that modification of these particular embodiments of the invention may be resorted to without departing from the scope of the invention as defined in the appended claims.

What is claimed is:

1. In control apparatus as described, A.C. power supply leads, a plurality of saturable reactors connected to the power supply leads, output from said reactors being adapted to be connected to a load, a negative and a positive control lead, diode and transformer means connecting said power supply leads to said control leads to set up D.C. voltage therein proportional to the current flow in said power supply leads, an opposition coil operatively associated with each of said saturable reactors, a potentiometer connected between said control leads, a transistor, a zener diode connecting the base of said transistor to said potentiometer, a second and normally conductive zener diode connecting to the collector of said transistor, means connecting the emitter of said transistor to said positive control lead to make said base of said transistor negative with reference to said emitter and render said transistor conductive when said first zener diode is fired, and circuit means connecting said opposition coils to the said second zener diode and to said power supply leads for current flow through said opposition coils to control the output of said saturable reactors by the current flow in said power supply leads.

2. A control system as in claim 1 where said circuit means include a second negative control lead, diode means connected to said power supply leads and to said second negative control lead and to said positive control lead to supply D.C. voltage thereto proportional to said power supply voltage, and a normally conductive zener diode is connected in parallel with said emitter and collector of said transistor to provide a second power supply to said opposition coils for power flow thereto when said transistor is nonconductive for control action based on voltage variations of the power source.

3. A control system for use in battery charging circuits including a three phase, three lead A.C. power supply, a saturable reactance for each power lead connected thereto, a diode connected to the output terminal of each of said reactances, a battery load, a positive and a negative load lead connected to said battery load, said positive load lead being connected to all of said diodes for flow of current to said battery load, a second saturable reactance for each of said power leads, diodes individually connecting said second reactances between said negative load lead and said power supply leads, said control system further including a pair of transformer coils individually operatively connected to different ones of said power supply leads, a positive and a negative control lead, rectifier means connecting said transformer coils to said positive and negative control leads for D.C. current flow thereto, a potentiometer connected across said control leads, a transistor the base of which is connected to said positive control lead, a zener diode connected between the base of said transistor and said potentiometer to be fired when a predetermined voltage is applied thereto to make said base negative with regards to said emitter and render said transistor conductive, a control coil on each of said reactances in electrical opposition thereto, and circuit means connecting the collector of said transistor to said control coils for current flow therethrough when said transistor conducts to cause said reactances to absorb more voltage and reduce the load current.

4. A battery charger for use with a three phase, three lead A.C. power supply, a saturable reactance for each power lead connected thereto, a diode connected to the output terminal of each of said reactances, a battery load, a positive and a negative load lead connected to said battery load, said positive load lead being connected to all of said diodes for flow of current to said battery load, a second saturable reactance for each load lead connected thereto, diodes individually connecting said second reactances to said negative lead, said control system further including a pair of current transformers individually operatively connected in different ones of said power supply leads, a positive and a negative control lead, rectifier means connecting said transformers to said positive and negative control leads, a potentiometer connected across said control leads, a transistor the emitter of which is connected to said positive control lead, a zener diode connected between the base of said transistor and said potentiometer to be made conductive when a predetermined voltage is applied thereto to make said base negative with regards to said emitter and render said transistor conductive, an opposition coil on each of said reactances, circuit means connecting the collector of said transistor to said opposition coils for current flow therethrough when said transistor conducts, a second negative control lead, means connected to said second negative and said positive control leads to supply D.C. voltage thereto proportional to the power supply voltage, said opposition coils being connected to said second negative control lead, and means connected to said positive control lead and to said opposition coils to maintain current flow through said opposition coils based proportional to said power supply voltage when said transistor is nonconductive.

5. In a battery charger for use with an A.C. power supply and having a battery connected thereto as a load, a saturable reactor connecting to the power supply to have load current pass therethrough, diode means connecting said reactor to a battery load for D.C. charging thereof, a pair of control coils associated with said reactor to create magnetic fields tending to decrease the saturation thereof and absorb more power supply volts therein, circuit means including a transformer and diode means connected to one of said control coils to provide voltage thereto proportional to the current in the power supply to limit load current when the charge cycle is in an initial phase of operation, means connected in said circuit means to energize one of said control coils by a voltage proportional to the power supply voltage as the load voltage increases in a second phase of the charge cycle, and second circuit means connecting to one of said control coils and actuated by the counter E.M.F. of the battery to be energized when the battery voltage approaches a fully charged condition to limit battery current at such third phase in the charge cycle.

6. In a battery charger for use with an A.C. power supply and having a battery connected thereto as a load, a saturable reactor connecting to the power supply to have load current pass therethrough, a diode means connecting said reactor to a battery load for D.C. charging thereof, a pair of control coils associated with said reactor to create magnetic fields tending to decrease the saturation thereof and absorb more power supply volts therein, circuit means including a transformer, diode means, a transistor and zener diode connected to one of said control coils to provide voltage thereto proportional to the current in the power supply to limit load current when the charge cycle is in an initial phase of operation, means connected in said circuit means to energize one of said control coils by a voltage proportional to the power supply voltage as the load E.M.F. increases in a second phase of the charge cycle, and circuit means connecting to one of said control coils and actuated by the counter E.M.F. at the battery to be energized when the battery voltage approaches a fully charged condition to limit battery current at such third phase in the charge cycle, said last-named circuit means including a zener diode therein as a circuit opening and closing member.

7. In a battery charger for use with a one phase A.C. power supply and having a battery connected thereto as a load, a saturable reactor connecting to the power supply to have load current pass therethrough, diode means connecting said reactor to a battery load for D.C. charging thereof, a pair of control coils associated with said reactor to create magnetic fields tending to decrease the saturation thereof and absorb more power supply volts therein, circuit means including a transformer, diode means, and a transistor connected to one of said control coils to provide voltage thereto proportional to the current in the power supply to limit load current when the charge cycle is in an initial phase of operation, second circuit means connected to energize one of said control coils by a voltage proportional to the power supply voltage, and third circuit means connecting to said first circuit means and the said transistor therein and actuated by the counter E.M.F. at the battery to be energized when the battery voltage approaches a fully charged condition to limit battery current at such third phase in the charge cycle.

8. In a battery charger for use with an A.C. power supply, a saturable reactor for connection to the load and power supply, a control coil operatively associated with said reactor to set up magnetic flux therein in opposition to the flux of the load current, first circuit means connected to said control coil to provide voltage thereto proportional to the current in the power supply to limit load current when the charge cycle is in an initial phase of operation, and means operatively connected in said first circuit means to energize said control coil by a voltage proportional to the power supply volts as the load voltage increases in a second phase of the charge cycle, said first circuit means including a pair of control leads, a normally conductive zener diode and a transistor connected in series with each other and said control coil to be conductive when said transistor is conductive, said transistor being connected to said control leads to be made conductive on supply of sufficient voltage thereto, and a normally conductive zener diode connected in parallel with said transistor to energize said control coil by a voltage proportional to the power supply voltage.

9. In a battery charger for use with an A.C. power supply and having a battery connected thereto as a load, a saturable reactor connecting to the power supply to have load current pass therethrough, diode means connecting said reactor to a battery load for D.C. charging thereof, a control coil associated with said reactor to create a magnetic field tending to decrease the saturation thereof and absorb more power supply volts therein, circuit means including a transformer and diode means connected to said control coils to provide voltage thereto proportional to the current in the power supply to limit load current when the charge cycle is in an initial phase of operation, and means connected in said circuit means to energize said control coil by a voltage proportional to the power supply voltage as the load voltage increases in a second phase of the charge cycle, said last-named means including a constant voltage reference means to subtract a constant voltage from the voltage in said circuit means to provide greater sensitivity to power supply voltage variation.

10. In a battery charger for use with an A.C. power supply and having a battery connected thereto as a load, a saturable reactor connecting to the power supply to have load current pass therethrough, diode means connecting said reactor to a battery load for D.C. charging thereof, a control coil associated with said reactor to create a magnetic field tending to decrease the saturation thereof and absorb more power supply volts therein, and circuit means including a transformer, a positive and a negative control lead, and diode means connected to said control coil to provide voltage thereto proportional to the current in the power supply to limit load current when the charge cycle is in an initial phase of operation, said circuit means including a transistor connected between said positive control lead and said control coil as a switch, conductive voltage reference means connected in parallel with said transistor, and a voltage reference device connecting to the base of said transistor to make it conductive only when predetermined voltage is provided to said voltage reference device.

11. In a battery charger for use with a single phase A.C. power supply and having a battery connected thereto as a load, a saturable reactor connecting to the power supply to have load current pass therethrough, diode means and load leads connecting said reactor to a battery load for D.C. charging thereof, a voltage reference means connected between said load leads, a pair of control coils associated with said reactor to create magnetic fields tending to decrease the saturation thereof and absorb more power supply volts therein, circuit means including a transformer, diode means, and a potentiometer connected to one of said control coils to provide voltage thereto proportional to the current in the power supply to limit load current when the charge cycle is in an initial phase of operation, second circuit means connecting to said first circuit means and to said load leads and including a potentiometer therein and actuated by the counter E.M.F. at the battery to be energized when the battery voltage approaches a fully charged condition to limit battery current at the final phase in the charge cycle, and a transistor trigger circuit connecting to said potentiometers and to said voltage reference means to control current flow in said first and second circuit means.

12. In a battery charger for use with an A.C. power supply and having a battery connected thereto as a load, a saturable reactor connecting to the power supply to have load current pass therethrough, diode means connecting said reactor to a battery load for D.C. charging thereof, a pair of control coils associated with said reactor to create magnetic fields tending to decrease the saturation thereof and absorb more power supply volts therein, circuit means including a transformer and diode means connected to one of said control coils to provide voltage thereto proportional to the current in the power supply to limit load current when the charge cycle is in an initial phase of operation, means to energize one of said control coils by a voltage proportional to the power supply voltage, and second circuit means connecting to one of said control coils and actuated by the counter E.M.F. of the battery to be energized when the battery voltage approaches a fully charged condition to limit battery current in the final phase in the charge cycle.

References Cited in the file of this patent

UNITED STATES PATENTS

| | | |
|---|---|---|
| 2,751,545 | Chase | June 19, 1956 |
| 2,759,142 | Hamilton | Aug. 14, 1956 |
| 2,903,639 | Meszaros | Sept. 8, 1959 |
| 2,903,640 | Bixby | Sept. 8, 1959 |
| 2,978,633 | Medlar | Apr. 4, 1961 |